US012012307B2

(12) United States Patent
Herkel et al.

(10) Patent No.: US 12,012,307 B2
(45) Date of Patent: Jun. 18, 2024

(54) ELEVATOR SAFETY SYSTEM

(71) Applicant: Otis Elevator Company, Farmington, CT (US)

(72) Inventors: Peter Herkel, Berlin (DE); Dirk H. Tegtmeier, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1366 days.

(21) Appl. No.: 16/518,173

(22) Filed: Jul. 22, 2019

(65) Prior Publication Data

US 2020/0031620 A1 Jan. 30, 2020

(30) Foreign Application Priority Data

Jul. 27, 2018 (EP) .................................... 18186068

(51) Int. Cl.

*B66B 5/00* (2006.01)
*B66B 1/28* (2006.01)
*B66B 1/34* (2006.01)
*B66B 5/02* (2006.01)
*B66B 13/22* (2006.01)

(52) U.S. Cl.

CPC .............. *B66B 5/0031* (2013.01); *B66B 1/28* (2013.01); *B66B 1/3461* (2013.01); *B66B 1/3492* (2013.01); *B66B 5/0025* (2013.01); *B66B 5/027* (2013.01); *B66B 13/22* (2013.01)

(58) Field of Classification Search

CPC ....... B66B 5/0031; B66B 1/28; B66B 1/3461; B66B 1/3492; B66B 5/0025; B66B 5/027; B66B 13/22; B66B 5/02; B66B 5/0087

See application file for complete search history.

(56) References Cited

U.S. PATENT DOCUMENTS 4,210,226 A 7/1980 Ichioka
4,898,263 A 2/1990 Manske et al.
(Continued)

FOREIGN PATENT DOCUMENTS

CN 1530315 A 9/2004
CN 102718100 A 10/2012
(Continued)

OTHER PUBLICATIONS

European Search Report for Application No. 18186068.5; dated Apr. 13, 2021; 5 Pages.
(Continued)

*Primary Examiner* — Jeffrey Donels

(74) *Attorney, Agent, or Firm* — CANTOR COLBURN LLP

(57) ABSTRACT

An elevator safety system (1) configured for monitoring an elevator system (2) comprises at least one safety node (12) and an evaluator (19). The at least one safety node (12) is configured for monitoring at least one component of the elevator system (2) and/or of the elevator safety system (1) and providing signals representing the current status of the at least one monitored component. The evaluator (19) configured for receiving the signals from the at least one safety node (12); and for determining a safety status of the elevator system (2) and/or of the elevator safety system (1) from a combination of the received signals.

16 Claims, 2 Drawing Sheets

(56) References Cited

U.S. PATENT DOCUMENTS

| | | | | |
|---|---|---|---|---|
| 6,173,814 | B1 * | 1/2001 | Herkel | B66B 1/3415 187/248 |
| 6,193,019 | B1 | 2/2001 | Sirigu et al. | |
| 7,252,180 | B2 | 8/2007 | Deplazes et al. | |
| 9,452,909 | B2 | 9/2016 | Taylor et al. | |
| 2013/0118836 | A1 | 5/2013 | Rossignol | |
| 2014/0190773 | A1 * | 7/2014 | Sonnenmoser | B66B 5/0031 187/247 |
| 2017/0297860 | A1 | 10/2017 | Krishnamurthy et al. | |
| 2017/0320703 | A1 | 11/2017 | Sonnenmoser et al. | |
| 2017/0349404 | A1 | 12/2017 | Sonnenmoser et al. | |
| 2017/0355559 | A1 | 12/2017 | Sonnenmoser et al. | |
| 2018/0186602 | A1 * | 7/2018 | Herkel | B66B 1/3461 |

FOREIGN PATENT DOCUMENTS

| | | | |
|---|---|---|---|
| CN | 105236251 | A | 6/2013 |
| CN | 103678952 | A | 3/2014 |
| CN | 105035902 | A | 11/2015 |
| CN | 205802701 | U | 12/2016 |
| CN | 205855667 | U | 1/2017 |
| CN | 107108156 | A | 8/2017 |
| CN | 107709209 | A | 2/2018 |
| CN | 108046079 | A | 5/2018 |
| CN | 207312859 | U | 5/2018 |
| CN | 108137268 | A | 6/2018 |
| EP | 0146412 | A2 | 6/1985 |
| EP | 0455919 | A2 | 11/1991 |
| EP | 1423326 | B1 | 3/2006 |
| EP | 1159218 | B1 | 7/2006 |
| EP | 1792864 | A1 | 6/2007 |
| EP | 2813459 | A1 | 12/2014 |
| EP | 2886499 | A1 | 6/2015 |
| EP | 2864231 | A1 | 5/2017 |
| EP | 3257798 | A1 | 12/2017 |
| JP | 2012086959 | A | 5/2012 |
| WO | 2018001830 | A1 | 1/2018 |
| WO | 2018010991 | A1 | 1/2018 |

OTHER PUBLICATIONS

European Search Report for application 18186068.5, dated Jan. 22, 2019, 7 pages.

* cited by examiner

ELEVATOR SAFETY SYSTEM

FOREIGN PRIORITY

This application claims priority to European Patent Application No. 18186068, filed Jul. 27, 2018, and all the benefits accruing therefrom under 35 U.S.C. § 119, the contents of which in its entirety are herein incorporated by reference.

BACKGROUND

The invention relates to an elevator safety system and to an elevator system comprising such an elevator safety system.

An elevator system comprises at least one elevator car traveling along a hoistway between a plurality of landings. An elevator system usually further comprises an elevator safety system configured for monitoring the operation of the elevator system and stopping any further movement of the elevator car in case a malfunction is detected.

A plurality of different malfunctions may occur in an elevator systems. These malfunctions in particular may include malfunctions causing severe safety issues which require stopping the elevator system immediately, and less severe malfunctions, which may allow continuing operating the elevator system at least for some time.

It therefore would be beneficial to provide an elevator safety system which is configured for stopping further operation of the elevator car when necessary but which also allows the elevator system to continue operating in case less severe malfunctions are detected.

BRIEF DESCRIPTION

According to an exemplary embodiment of the invention, an elevator safety system, which is configured for monitoring an elevator system, comprises at least one safety node and an evaluator. The at least one safety node is configured for monitoring at least one component of the elevator system and/or of the elevator safety system and providing signals representing the current status of the at least one monitored component. The evaluator is configured for receiving the signals from the at least one safety node; and for determining a safety status of the elevator system and/or of the elevator safety system from a combination of the received signals.

Exemplary embodiments of the invention also include an elevator system comprising at least one elevator car configured for moving along a hoistway between a plurality of landings and an elevator safety system according to an exemplary embodiment of the invention.

An elevator safety system according to an exemplary embodiment of the invention, allows reliably determining the safety status of an elevator system and/or of an elevator safety system based on a combination of safety signals provided by at least one safety node.

The evaluator of the elevator safety system is capable of distinguishing between severe malfunctions and/or safety issues signaled by the received signals, which require stopping the elevator car immediately, and less severe malfunctions and/or safety issues which allow continuing operating the elevator system at least for some time, e.g. for finishing the current run and/or moving the elevator car to the nearest landing in order to allow passengers to leave the elevator car without external assistance.

The evaluator in particular is configured for evaluating the received signals not only individually, but also for taking into account relations and interactions between different malfunctions. This allows the elevator safety system to appropriately react to situations in which a plurality of malfunctions and/or safety issues are reported, and wherein each malfunction or safety issue on its own is not severe, but the combination of malfunctions and/or safety issues may result in a dangerous situation.

Thus, an elevator safety system according to an embodiment of the invention is capable of stopping any further movement of the elevator car when necessary, but it also allows the elevator system to continue operating in case less severe malfunctions and/or safety issues are detected in order to avoid an unnecessary interruption of the service provided by the elevator system A number of optional features are set out in the following. These features may be realized in particular embodiments, alone or in combination with any of the other features.

The at least one component monitored by the at least one safety node may include the respective safety node itself. Thus, the elevator safety system is capable of detecting problems of/at one of its safety nodes which might compromise the safety of the elevator system.

In case the safety system comprises at least two safety nodes, the safety nodes may be configured to monitor each other in order to enhance the reliability of the safety system even further.

The evaluator may use a virtual multi-dimensional matrix for assigning a safety status to every combination of received signals. Such a virtual multi-dimensional matrix allows defining unambiguous relations between the received signals and associated safety statuses of the elevator system and/or of the elevator safety system.

Each signal sent from the at least one safety node to the evaluator may include at least one element identifying a detected malfunction and/or safety issue in order to allow the evaluator to recognize the detected malfunction for reacting appropriately to the detected malfunction and/or safety issue.

Each signal sent from the at least one safety node to the evaluator may include at least one element indicating the severity of a detected malfunction and/or safety issue, in order to allow the evaluator to easily determine the current safety status of the elevator system and/or elevator safety system. The at least one element indicating the severity of a detected malfunction and/or safety issue in particular may include a numerical value.

The safety status of the elevator system and/or elevator safety system may be a function, in particular a multi-dimensional function, of the numerical values comprised in the received signals. The safety status in particular may be a sum, a weighted sum, or a polynomial combination of the numerical values comprised in the received signals. Using such a multi-dimensional function allows determining the safety status of the elevator system and/or of the elevator safety system easily.

In order to allow transmitting signals form the at least one safety node to the evaluator, the at least one safety node and the evaluator may be connected to each other by a communication link, in particular by a serial field bus, such as a CAN bus, which is configured for transmitting signals between the at least one safety node and the evaluator. A serial field bus, such as a CAN bus, allows a reliable transmission of signals between a plurality of safety nodes and the evaluator at low costs.

The elevator safety system may further comprise a controller configured for assigning a reaction corresponding to the respective safety status in order to allow the elevator safety system to react properly to the detected safety status.

The controller may be integrated with the evaluator. The controller also may be connected with the evaluator by a communication link, in particular by a serial field bus, such as a CAN bus, in order to allow the controller to communicate with the evaluator.

The reactions of the elevator safety system assigned by the controller may include recording the current safety status and/or the current signals and operating the elevator system in a normal operation mode in case only a less severe malfunction and/or safety issue has been detected.

The reactions of the elevator safety system may further include limiting the elevator operation in time, e.g. allowing the elevator system to continue operating for only a predefined number of hours, days or weeks, and/or limiting the movement of the elevator car to certain areas in the hoistway. The reactions of the elevator safety system may also include limiting the maximum allowable speed of the elevator car until the detected malfunction and/or safety issue has been remedied. These reactions may be combined, i.e. the elevator system may be allowed operating with reduced speed and/or within a restricted area of the hoistway only for a limited period of time.

In case a more severe malfunction and/or safety issue has been detected, the reaction assigned by the controller may include moving an elevator car of the elevator system to the next target landing of a current run and stopping any further operation of the elevator system after the elevator car has reached said target landing. Optionally, the maximum allowable speed of the elevator car may be reduced.

In case an even more severe malfunction and/or safety issue has been detected, the reaction assigned by the controller may include moving the elevator car of the elevator system to a nearest landing and stopping any further operation of the elevator system after the elevator car has reached said nearest landing. Optionally, the maximum allowable speed of the elevator car may be reduced.

In case a very severe malfunction and/or safety issue has been detected, the reaction assigned by the controller may include immediately stopping any further operation of the elevator system and issuing an alarm message requesting a mechanic to visit the elevator system in order to free passengers trapped within the elevator car. Operation of the elevator system may be stopped by gradually reducing the speed of the elevator car down to zero, or by interrupting the safety chain for causing an emergency stop.

In any case in which a malfunction and/or safety issue has been detected, a maintenance message may be issued requesting to visit the elevator system in order to check the elevator system and/or the elevator safety system and remedy all detected malfunctions and/or safety issues.

The at least one safety node may include at least one detector configured for detecting a malfunction related to the safety node itself. Said at least one detector in particular may include at least one of a voltage detector configured for detecting a voltage at a component of the elevator system and/or of the elevator safety system; a signal noise detector configured for detecting signal noise in a signal input into the at least one safety node; and a ground fault detector configured for detecting a ground fault of a component of the elevator system and/or of the elevator safety system.

The at least one safety node may employ at least one detector for detecting a malfunction of components of the elevator system other than the at least one safety node. Said at least one detector may be connected to or formed integrally with the at least one safety node—Said components and/or detectors in particular may include at least one of a position sensor configured for detecting the position of an elevator car; a speed sensor configured for detecting the speed of the elevator car; an acceleration sensor configured for detecting the acceleration of the elevator car; a door sensor configured for detecting a current status of a door, such as a landing door or an elevator car door, of the elevator system. The door sensor in particular may be configured for detecting whether the at least one door, which is monitored by the door detector, is properly closed.

DRAWINGS DESCRIPTION

In the following, an exemplary embodiment of the invention is described with reference to the enclosed figures.

FIG. 1 schematically depicts an elevator system comprising an elevator safety system according to an exemplary embodiment of the invention.

FIG. 2 schematically depicts a safety node of an elevator safety system according to an exemplary embodiment of the invention.

DETAILED DESCRIPTION

Figure 1:
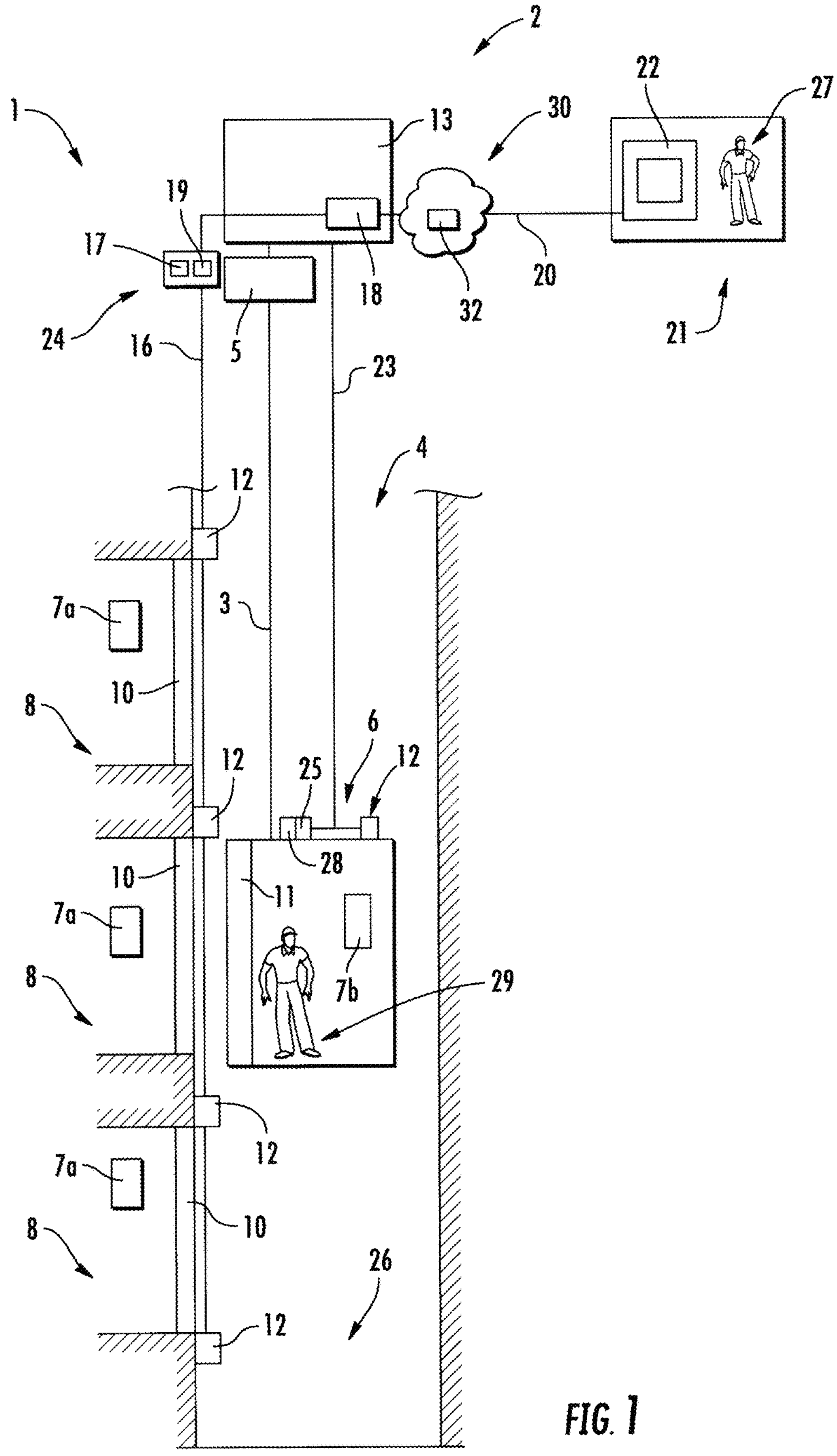

FIG. 1 schematically depicts an elevator system 2 comprising an elevator safety system 1.

The elevator system 2 comprises an elevator car 6 movably suspended within a hoistway 4 extending between a plurality of landings 8 located on different floors.

The elevator car 6 is movably suspended by means of a tension member 3. The tension member 3, for example a rope or belt, is connected to a drive 5, which is configured for driving the tension member 3 in order to move the elevator car 6 along the height of the hoistway 4 between the plurality of landings 8.

Each landing 8 is provided with an elevator landing door (hoistway door) 10, and the elevator car 6 is provided with an elevator car door 11 allowing passengers 29 to transfer between a landing 8 and the interior of the elevator car 6 when the elevator car 6 is positioned at the respective landing 8.

The exemplary embodiment of the elevator system 2 shown in FIG. 1 employs a 1:1 roping for suspending the elevator car 6. The skilled person, however, easily understands that the type of the roping is not essential for the invention and that different kinds of roping, e.g. a 2:1 roping, may be used as well. The elevator system 2 may further include a counterweight (not shown) moving concurrently and in opposite direction with respect to the elevator car 6. Alternatively, the elevator system 2 may be an elevator system 2 without a counterweight, as it is shown in FIG. 1. The drive 5 may be any form of drive used in the art, e.g. a traction drive, a hydraulic drive or a linear drive. The elevator system 2 may have a machine room or may be a machine room-less elevator system. The elevator system 2 may use a tension member 3, as it is shown in FIG. 1, or it may be an elevator system without a tension member 3.

The drive 5 is controlled by an elevator control 13 for moving the elevator car 6 along the hoistway 4 between the different landings 8.

Input to the elevator control 13 may be provided via landing control panels 7*a*, which may include destination call panels, provided on each landing 8 close to the landing doors 10, and/or via a car operation panel 7*b* provided inside the elevator car 6.

The landing control panels 7*a* and the car operation panel 7*b* may be connected to the elevator control 13 by means of electrical lines, which are not shown in FIG. 1, in particular by an electric bus, e.g. a field bus such as a CAN bus, or by wireless data connections.

For determining the current position of the elevator car 6, the elevator system 2 is provided with at least one position sensor 25 configured for detecting the current position (height) of the elevator car 6 within the hoistway 4. The position sensor 25 may also allow determining the speed of the movement of the elevator car 6. Alternatively, a speed and/or acceleration sensor 28 may be provided at the elevator car 6.

The position sensor 25 is connected with the elevator control 13 via a signal line 23, or via a wireless connection (not shown) configured for transmitting the detected position of the elevator car 6 to the elevator control 13.

A safety circuit 24 is configured for monitoring the safety of the elevator system 2. A communication link 16 connects the safety circuit 24 with a plurality of safety nodes 12. The communication link 16 may include a field bus, e.g. a CAN bus, or any other communication means, such as electrical lines or a wireless data connection, suitable for reliably transmitting signals between the safety nodes 12 and the safety circuit 24.

In case a malfunction causing a safety issue, which is relevant for the safety of the elevator system 2, is detected by at least one of the safety nodes 12, the respective safety node 12 sends a signal indicating the detected safety issue via the communication link 16 to the safety circuit 24.

Figure 2:
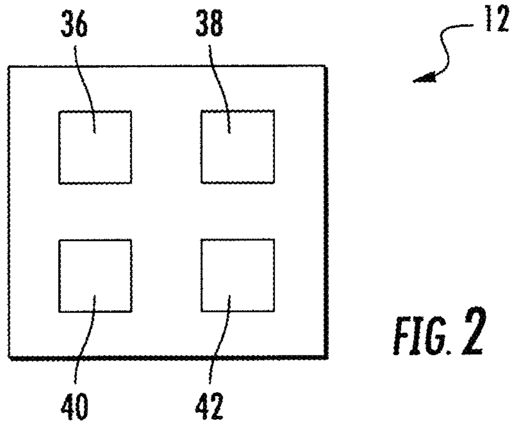

FIG. 2 depicts an enlarged schematic view of a safety node 12 of an elevator safety system 1 according to an exemplary embodiment of the invention.

The safety node 12 comprises a voltage detector 36 configured for detecting a voltage at a component of the elevator system 2 and/or of the elevator safety system 1. This in particular may include the voltage supplied to the safety node 12 itself.

On the exemplary embodiment depicted in FIG. 2, the safety node 12 further comprises a signal noise detector 38 configured for detecting noise in a signal received by the safety node 12, and a ground fault detector 40 configured for detecting a ground fault of at least one component of the elevator system 2 and/or of the elevator safety system 1. The monitored components in particular may include the safety node 12 itself.

In other embodiments, which are not explicitly shown in the figures, the safety node 12 additionally or alternatively may comprise other sensors configured for detecting other safety relevant components of the elevator system 2.

The safety node 12 also comprises or is connected with a door sensor 42 configured for detecting an opening status of a landing door 10 or an elevator car door 11 of the elevator system 2, respectively. The door sensor 42 in particular may be configured for detecting whether said door 10, 11 is properly closed or not.

Referring to FIG. 1 again, the safety circuit 24 is configured for determining the severity of the detected malfunction(s)/safety issue(s) and for causing the elevator system 2 to react appropriately.

The safety of the elevator safety system 1 as well as the safety of the elevator system 2 may be compromised by malfunctions of at least one of the safety nodes 12 and/or of the communication link 16. Thus, the safety nodes 12 are configured not only for monitoring a respectively associated component of the elevator system 2, such as a landing door 10 or an elevator car door 11, but additionally for monitoring the functionality of the elevator safety system 1 itself. Each safety node 12 in particular may be configured for monitoring itself and for reporting any safety issues and/or (potential) malfunctions, which might compromise the safety of the elevator safety system 1, to the safety circuit 24.

The safety circuit 24 comprises an evaluator 19, which is configured for receiving the signals sent by the safety nodes 12 and determining the current safety status of the elevator system 2, in particular the elevator safety system 1, based on the signals received from the safety nodes 12. The safety circuit 24 further comprises a controller 17, which is configured to cause the elevator system 2 to appropriately react to the current safety status determined by the evaluator 19.

Said reaction triggered by the controller 17 may include noting and/or storing the detected malfunction and allowing the elevator system 2 to continue operating normally in case the signaled malfunction is considered as not being severe.

In case a more severe malfunction has been detected, the elevator system 2 may be allowed to finish the current run, i.e. to move the elevator car 6 to the desired target landing 8 of the current run, but any further operation of the elevator system 2 is stopped after said target landing 8 has been reached and the respective landing door 10 and the elevator car door 11 have been opened in order to allow passengers 29 to leave the elevator car 6.

In case an even more severe malfunction has been detected, the elevator car 6 may be allowed to move only to the nearest landing 8, i.e. the landing 8 which is closest to the current position of the elevator car. In case very severe malfunction has been detected, the movement of the elevator car 6 may be stopped immediately, even if the elevator car 6 is currently positioned between two landings 8 and it is impossible for the passengers 29 to leave the elevator car 6 via the doors 10, 11 so that the passengers 29 need to be rescued from the elevator car 6.

The reaction triggered by the controller 17 may further include that a communication circuit 18 provided within, or connected with, the elevator control 13 establishes a data connection 20 between the elevator control 13 and/or the safety circuit 24 and an external server 22 for sending an alarm message to the external server 22. The external server 22 may be provided spatially separated from the elevator system 2, e.g. in a remote service center 21. The external server 22 may be configured for connecting with a plurality of elevator systems 2, in particular elevator systems 2 located at various locations.

The data connection 20 between the elevator system 2 and the external server 22 may be established via the Internet 30, in particular via a virtual private network (VPN) and/or via a virtual cloud 32 within the Internet. The data connection 20 may include a conventional telephone line or a digital line such as ISDN or DSL. It further may include wireless communication systems including WLAN, GMS, UMTS, LTE, Bluetooth® etc.

The external server 22 may record the reported malfunction and/or send a mechanic 27 to the elevator system 2 in order to free passengers 29 trapped within the elevator car 6, to check the elevator system 2 and/or to repair the reported malfunction.

As two malfunctions, which are individually considered as causing less severe safety issued, may result in a considerably more severe safety issue when occurring simultaneously, the evaluator 19 does not only consider each safety signal on its own for determining the current safety status of the elevator system 2. Instead, the evaluator 19 is configured for taking into account the interactions of different malfunctions as well.

The evaluation for example may be based on a multi-dimensional virtual matrix, wherein the coordinates ("lines" and "rows") of the matrix represent the different signals indicating a malfunction, and the entries of the matrix addressed by the coordinates represent a safety level and/or a reaction of the elevator safety system 1 to the current safety status represented by the safety signals.

Figure 3:
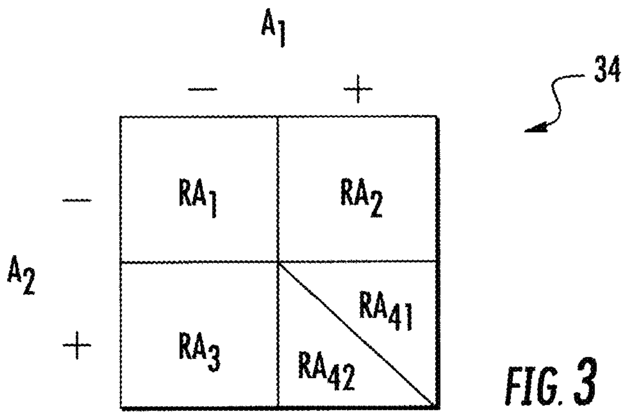
FIG. 3 illustrates a first example of a two-dimensional excerpt of a multi-dimensional virtual matrix used for determining the current safety status of an elevator system.
Figure 4:
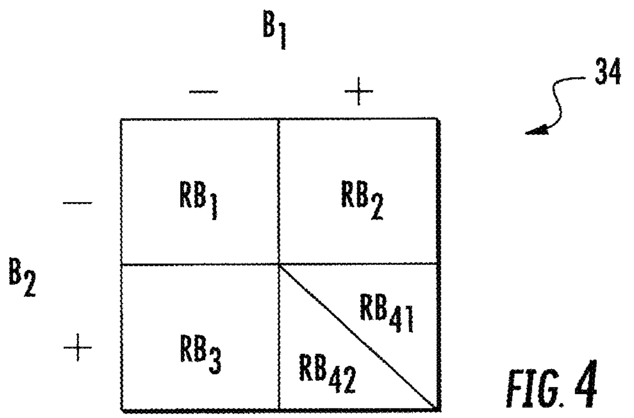
FIG. 4 illustrates a second example of a two-dimensional excerpt of a multi-dimensional virtual matrix used for determining the current safety status of an elevator system.

Examples of two-dimensional excerpts 34 of a multi-dimensional virtual matrix are illustrated in FIGS. 3 and 4, respectively.

FIG. 3 illustrates a situation related to detecting excessive noise on an input signal of the safety node 12 (signal A1) and to detecting an undervoltage, i.e. a voltage which is below a predefined limit, at a safety node 12 (signal A2). The excessive noise and/or the undervoltage may be detected at the same safety node 12 or at two different safety nodes 12 of the elevator safety system 1.

In FIGS. 3 and 4, "+" indicates that a signal indicating the respective malfunction is present, and "–" indications that no signal indicating the respective malfunction is present.

RA1, RA2, RA3, RA4 represent the safety levels associated with a respective combination of safety signals. A specific reaction of the elevator system 2 is associated with each of the safety levels RA1, RA2, RA3, RA4.

In case none of the two signals A1, A2 is present (A1, A2)=(–,–), the elevator system 2 continues with normal operation (safety level RA1) as neither an undervoltage nor excessive noise have been detected.

In case excessive noise is detected on an input signal of a safety node 12 (A1=+) but no undervoltage is detected at the safety node (A2=–), the safety level of the elevator system 2 is set to "RA2". As a result, the detection of excessive noise is recorded and/or reported, but the elevator system 2 is allowed to proceed with normal operation.

In case excessive noise is detected for more than a predetermined period of time, a report may be sent to the service center 21 requesting a mechanic 27 to visit and check the elevator system 2, in particular its wiring.

In case an undervoltage is detected at a safety node 12, i.e. it is detected that the voltage supplied to the safety node 12 is below a first limit, but no excessive noise is detected on an input signal of a safety node 12, the occurrence of an undervoltage is recorded and/or reported, but the elevator system 2 is allowed to proceed with normal operation.

In case the detected voltage falls below a second limit, which is lower than the first limit, the elevator system 2 may be allowed to finish the current run, but operation of the elevator system 2 may be paused after the elevator car 6 has reached the desired target landing 8 until the voltage raises back to a value above the first or second limit. Additionally or alternatively, a maintenance message reporting the detected undervoltage may be sent to the service center 21.

Thus, as excessive noise and undervoltage, when occurring individually, do not result in a severe safety issue, normal operation of the elevator system 2 is continued when only one of said signals (A1, A2) is received.

In case, however, excessive noise and undervoltage are detected simultaneously (A1="+", and A2="+"), it is detected whether noise and undervoltage are detected at the same safety node 12.

In case excessive noise and undervoltage are reported from different safety nodes, e.g. a first safety node 12 attached to the elevator car 6, and a second safety node 12 arranged at the bottom, in particular in a pit 26, of the hoistway 4, this is not considered as a severe safety issue, and the elevator safety system 1 proceeds (RA41) with a combination of the reactions (RA2, RA3) described before with respect to each of the individual malfunctions.

In case, however, excessive noise and undervoltage are reported from the same safety node 12, the safety level is set to RA42. In this case, the elevator system 2 is allowed to finish its current run, i.e. to move the elevator car 6 to the desired target landing 8 and to open the elevator car door 11 and the respective landing door 10, but the elevator car 6 is not allowed to move away from said target landing 8 as long as undervoltage and excessive noise are detected. Additionally, a maintenance message indicating the malfunction may be sent to the service center 21 requesting a mechanic 27 to visit and check the elevator system 2.

A second example is illustrated by FIG. 4 showing another excerpt 34 of the multi-dimensional virtual matrix.

In said second example, the presence of signal B1 indicates a ground fault detected at a first safety node 12, and the presence of signal B2 indicates a ground fault detected at a second safety node 12.

In case no ground fault is detected (B1,B2)=(–,–), there is not safety issue and the elevator system 2 operates normally (RB1).

The occurrence of a single ground fault does not result in a dangerous situation. Thus, in case only a single ground fault is detected (B1,B2)=(+,–) or (B1,B2)=(–,+), a message is sent to the service center 21, but the elevator system 2 is continues operating normally (RB2, RB3).

In case, however, two ground faults are detected simultaneously (B1,B2)=(+,+), the evaluator 19 checks whether the two ground faults are detected at the same safety node 12 (RB41, RB42).

In case the detected ground faults originate from different safety nodes 12, e.g. a first safety node 12 mounted to the elevator car 6, and a second safety node 12 located within the hoistway 2, this is not considered as a severe safety issue. Thus, the service center 21 is informed about the detected ground faults, but normal operation of the elevator system 2 is continued (RB41).

In case, however, the two detected ground faults originate from the same safety node 12, this combination of ground faults may result in a bypass of a safety sensor input resulting in a potential dangerous situation. Thus, in this case (RB42) the elevator safety system 1 does not wait for the elevator system 2 to finish its current run moving the elevator car 6 to the target landing 8. Instead, the elevator car 6 is moved to and stopped at the nearest landing 8, i.e. the landing 8 closest to the current position of the elevator car 6. Additionally, the service center 21 is informed in order to send a mechanic 27 to visit the elevator system 2 for solving the detected problem.

Apparently, the malfunctions discussed with reference to FIGS. 3 and 4 are only examples, and the skilled person will understand that the discussed principles and methods of evaluating signals provided by a plurality of safety nodes 12 similarly may be applied to other malfunctions, problems and/or safety issues as well.

In the exemplary embodiments described before, the signals provided by the safety nodes 12 in particular indicate the status of the respective safety node 12 reporting internal problems and/or malfunctions of the respective safety node 12 itself.

In further embodiments, the signals sent by the safety nodes 12, may also indicate problems and/or malfunctions of other components of the elevator system 2, such as landing doors 10 or elevator car doors 11 not properly being closed and/or a malfunction of the position sensor 25 or other sensors of the elevator system 2.

Further, in the foregoing, the evaluation of the signals received by the evaluator 19 has been described with respect to an example employing a virtual multi-dimensional matrix.

This, however, is only one of several options, and different methods of evaluating the signals received by the evaluator 19 may be employed alternatively or in addition to such a virtual multi-dimensional matrix.

For example, each signal send by one of the safety nodes 12 may comprise or may be associated with a predefined numerical value, and the evaluator 19 may calculate the current safety level of the elevator system 2 numerically from the numerical values comprised in the received signals.

The safety level of the elevator system 2, for example, may be a sum, a weighted sum or a polynomial combination or any other multi-dimensional numerical function of the numerical values comprised in the received signals.

The safety circuit 24, the evaluator 19 and/or the controller 17 may be provided as a programmable computer, in particular a micro-processor, running an appropriate program (software) for providing the desired functionalities. Alternatively or additionally, the safety circuit 24, the evaluator 19 and/or the controller 17 may include appropriate electronic hardware, in particular application-specific integrated circuits (ASICs), which are configured for providing the desired functions.

While the invention has been described with reference to exemplary embodiments, it will be understood by those skilled in the art that various changes may be made and equivalents may be substituted for elements thereof without departing from the scope of the invention. In addition, many modifications may be made to adopt a particular situation or material to the teachings of the invention without departing from the essential scope thereof. Therefore, it is intended that the invention is not limited to the particular embodiments disclosed, but that the invention includes all embodiments falling within the scope of the claims.

REFERENCES

1 elevator safety system
2 elevator system
3 tension member
4 hoistway
5 drive
6 elevator car
7*a* landing control panel
7*b* car operation panel
8 landing
10 hoistway door
11 elevator car door
12 safety node
13 elevator control
16 communication link
17 controller
18 communication circuit
19 evaluator
20 data connection
21 service center
22 external server
23 signal line
24 safety circuit
25 position sensor
26 pit
27 mechanic
28 speed and/or acceleration sensor
29 passenger
30 Internet
32 virtual cloud
34 excerpt of a multi-dimensional virtual matrix
36 voltage detector
38 signal noise detector
40 ground fault detector
42 door sensor

What is claimed is:

1. Elevator safety system (1) configured for monitoring an elevator system (2) and comprising:
- at least one safety node (12) configured for monitoring at least one component of the elevator system (2) and/or of the elevator safety system (1) and providing signals representing the current status of the at least one monitored component;
- an evaluator (19) configured for receiving the signals from the at least one safety node (12); and
  - for determining a safety status of the elevator system (2) and/or of the elevator safety system (1) from a combination of the received signals;
- wherein the evaluator (19) includes a multi-dimensional virtual matrix configured for assigning a safety status to each combination of received signals.

2. Elevator safety system (1) according to claim 1, wherein the at least one monitored component includes the respective safety node (12) itself.

3. Elevator safety system (1) according to claim 1, wherein each signal comprises at least one element identifying a detected malfunction.

4. Elevator safety system (1) according to claim 1, wherein the at least one safety node (12) and the evaluator (19) are connected to each other by a communication link (16).

5. Elevator safety system (1) according to claim 1, further comprising a controller (17) configured for assigning a reaction corresponding to the respective safety status of the elevator safety system (1).

6. Elevator safety system (1) according to claim 5, wherein the controller (17) is integrated with the evaluator (19).

7. Elevator safety system (1) according to claim 6, wherein the controller (17) is connected with the evaluator (19) via a communication link (16).

8. Elevator safety system (1) according to claim 5, wherein the reactions assigned by the controller (17) include at least one of:
- recording the current safety status and/or the current signals;
- operating the elevator system (2) in a normal operation mode;
- immediately stopping any operation of the elevator system (2);
- moving an elevator car (6) of the elevator system (2) to a nearest landing (8) and stopping any further operation of the elevator system (2) after the elevator car (6) has reached said nearest landing (8);
- moving an elevator car (6) of the elevator system (2) to the next target landing (8) of a current run and stopping any further operation of the elevator system (2) after the elevator car (6) has reached said target landing (8);
- issuing an alarm message; and
- issuing a maintenance message.

9. Elevator safety system (1) according to claim 1, wherein the at least one safety node (12) includes at least one of:

a voltage detector (36) configured for detecting a voltage at a component of the elevator system (2) and/or of the elevator safety system (1);

a signal noise detector (38) configured for detecting a signal noise in a signal input into the at least one safety node (12);

a ground fault detector (40) configured for detecting a ground fault of a component of the elevator system (2) and/or of the elevator safety system (1);

a position sensor (25) configured for detecting the position of an elevator car (6);

a speed and/or an acceleration sensor (28) configured for detecting the speed and/or the acceleration of the elevator car (6); and a door sensor (42) configured for detecting a current status of a door (10, 11) of the elevator system (2).

10. Elevator system comprising at least one elevator car (6) configured for moving along a hoistway (4) between a plurality of landings (8); and an elevator safety system (1) according to claim 1.

11. Elevator safety system (1) according to claim 4, wherein the communication link comprises a serial field bus configured for transmitting signals between the at least one safety node (12) and the evaluator (19).

12. Elevator safety system (1) according to claim 7, wherein the communication link comprises a serial field bus.

13. Elevator safety system (1) configured for monitoring an elevator system (2) and comprising:

at least one safety node (12) configured for monitoring at least one component of the elevator system (2) and/or of the elevator safety system (1) and providing signals representing the current status of the at least one monitored component;

an evaluator (19) configured for receiving the signals from the at least one safety node (12); and for determining a safety status of the elevator system (2) and/or of the elevator safety system (1) from a combination of the received signals;

wherein each signal comprises at least one element indicating the severity of a detected malfunction.

14. Elevator safety system (1) according to claim 13, wherein the at least one element includes a numerical value.

15. Elevator safety system (1) according to claim 14, wherein the safety status is a function of the numerical values comprised in the received signals.

16. Elevator safety system (1) according to claim 15, wherein the safety status is a sum, a weighted sum, or a polynomial combination of the numerical values comprised in the received signals.

* * * * *